(12) United States Patent
Katou

(10) Patent No.: US 7,774,415 B2
(45) Date of Patent: Aug. 10, 2010

(54) MANAGEMENT ASSISTANCE DEVICE, MANAGEMENT ASSISTANCE METHOD, AND COMPUTER PROGRAM FOR MANAGING RESPONSES TO E-MAILS

(75) Inventor: Taiji Katou, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 475 days.

(21) Appl. No.: 11/763,193

(22) Filed: Jun. 14, 2007

(65) Prior Publication Data
US 2007/0299922 A1 Dec. 27, 2007

(30) Foreign Application Priority Data
Jun. 21, 2006 (JP) ............................. 2006-171205

(51) Int. Cl.
G06F 15/16 (2006.01)

(52) U.S. Cl. ..................... 709/206; 709/207; 379/88.22

(58) Field of Classification Search ................. 709/206, 709/207; 379/88.22
See application file for complete search history.

(56) References Cited

U.S. PATENT DOCUMENTS

2008/0301252 A1* 12/2008 Lipton et al. ................. 709/207

FOREIGN PATENT DOCUMENTS

| JP | 2002-49564 A | 2/2002 |
| JP | 2003-256335 A | 9/2003 |
| JP | 2003-296251 A | 10/2003 |

* cited by examiner

Primary Examiner—Frantz B Jean
(74) Attorney, Agent, or Firm—Sughrue Mion, PLLC

(57) ABSTRACT

A mail sending and receiving unit provided to a terminal for person in charge receives inquiry mails to which uniquely identifiable receipt numbers are added, and reply mails sent in response to the inquiry mails. An e-mail storage unit stores the incoming e-mails received by the mail sending and receiving unit, and the receipt numbers added to the incoming e-mails. The mail sending and receiving unit sends reply e-mails which are created in response to the incoming e-mails stored in the e-mail storage unit, and to which the receipt numbers of the corresponding incoming e-mails are added. A management screen generation unit displays the inquiry mails stored in the e-mail storage unit, and the reply mails, as being associated with each other by use of the receipt numbers of the respective inquiry mails.

13 Claims, 8 Drawing Sheets

```
From: abcd@abcd.com
To: Info@necel.com
Subject: [s-info:45830] INQUIRY (uPD98431)
Date: Fri, 26 May 2006 10:27:40 +0900
Content-Type: text/plain: charset="iso-2022-jp"
Content-Transfer-Encoding: 7bit
```

INQUIRY CONTENT

```
NAME          : ○○○○
E-MAIL        : abcd@abcd.com
COMPANY NAME  : ABCD, INC.
DIVISION NAME : DEVELOPMENT DIVISION
PHONE         : 03-XXXX-0001

SUBJECT : INQUIRY (uPD98431)
PRODUCT NAME : uPD98431
```

FIG. 5

From: abcd@abcd.com
To: uz@necel.com
Subject: [uz:17581] [s-info:45830] INQUIRY (uPD98431)
Date: Fri, 26 May 2006 10:27:55 +0900
Content-Type: text/plain: charset="iso-2022-jp"
Content-Transfer-Encoding: 7bit RECEIPT NUMBER : s-info 45830
PERSON IN CHARGE :
RECEIVED DATE AND TIME : 2006/5/26 10:27:00
   INQUIRER : GENERAL CLIENT
   PRODUCT NAME : uPD98431
   CONTENT OF INQUIRY :
CUSTOMER COMPANY NAME : ABCD, INC.
         DIVISION : DEVELOPMENT DIVISION
         NAME : ○○○○
         PHONE : 03-XXXX-0001
         FAX : 03-XXXX-0002
         E-MAIL : abcd@abcd.com

《《《《《《《《BELOW IS CONTENT OF RECEIVE MAIL 》》》》》》》》

CONTENT OF INQUIRY

FIG. 6

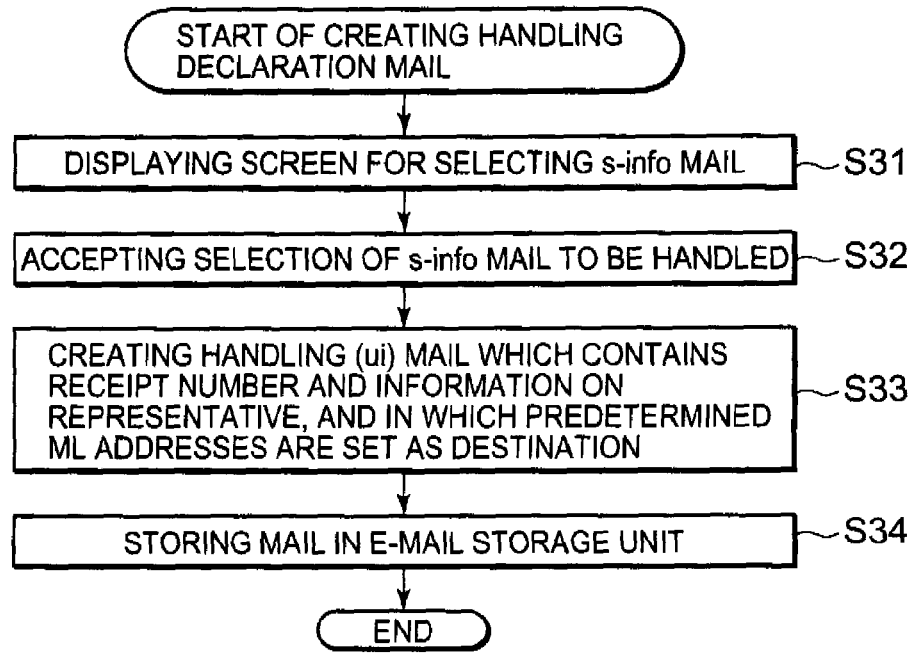

FIG. 7

From: katoh@necel.com
To: ui@necel.com
Subject: [ui:74128]fw: [s-info:45830] INQUIRY (uPD98431)
Date: Fri, 26 May 2006 10:55:11 +0900
Content-Type: text/plain: charset="iso-2022-jp"
Content-Transfer-Encoding: 7bit RECEIPT NUMBER : s-info 45830
PERSON IN CHARGE : KATO
RECEIVED DATE AND TIME : 2006/5/26 10:27:00

INQUIRER : GENERAL CONSUMER
PRODUCT NAME : uPD98431
CONTENT OF INQUIRY : OVERFLOW OF RECEIVED FIFO
CUSTOMER COMPANY NAME : ABCD, INC.
DIVISION : DEVELOPMENT DIVISION
NAME : ○○○○
PHONE : 03-XXXX-0001
FAX : 03-XXXX-0002
E-MAIL : abcd@abcd.com

《《《《《《《《BELOW IS CONTENT OF RECEIVED MAIL》》》》》》》》

CONTENT OF INQUIRY

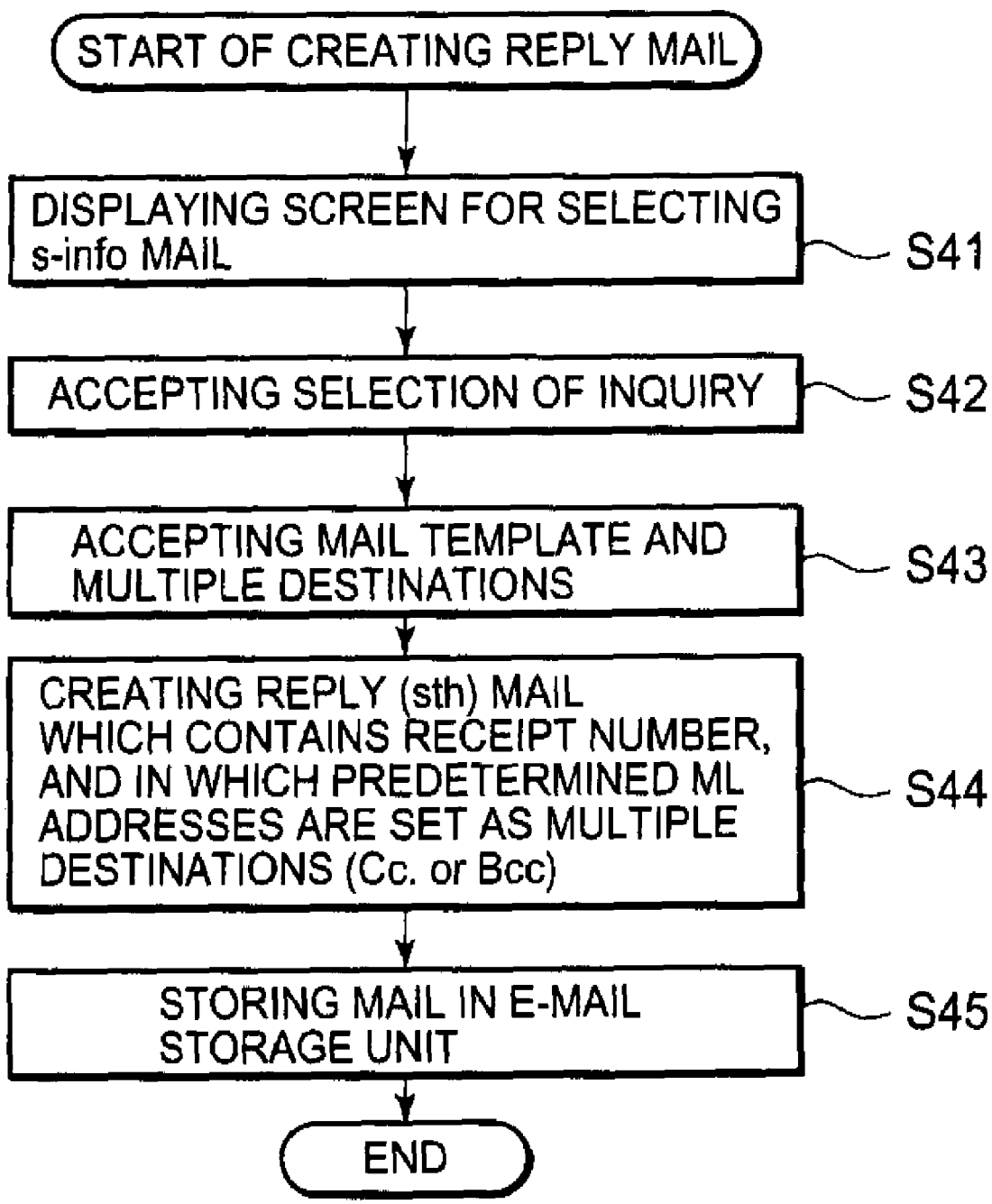

FIG. 9

```
From: info@necel.com
To: abcd@abcd.com
Subject: [sth:34363]Re: [s-info:45830] INQUIRY (uPD98431)
Date: Fri, 26 May 2006 16:15:41 +0900
Content-Type: text/plain: charset="iso-2022-jp"
Content-Transfer-Encoding: 7bit
========================================================
    PRODUCT NAME          : uPD98431
    CONTENT OF INQUIRY    : OVERFLOW OF RECEIVED FIFO
    RECEIVED DATE         : MAY 26, 2006
NAME OF INQUIRING COMPANY : DEVELOPMENT DIVISION, ABCD, INC.
                    NAME  : MR/ MS.
========================================================
DEAR MR/ MS.
  THE FOLLOWING IS OUR REPLY TO YOUR INQUIRY.
  [REPLY]
      ┌─────────────────────────────────────┐
      │   CONTENT OF REPLY                  │
      └─────────────────────────────────────┘
```

FIG. 10

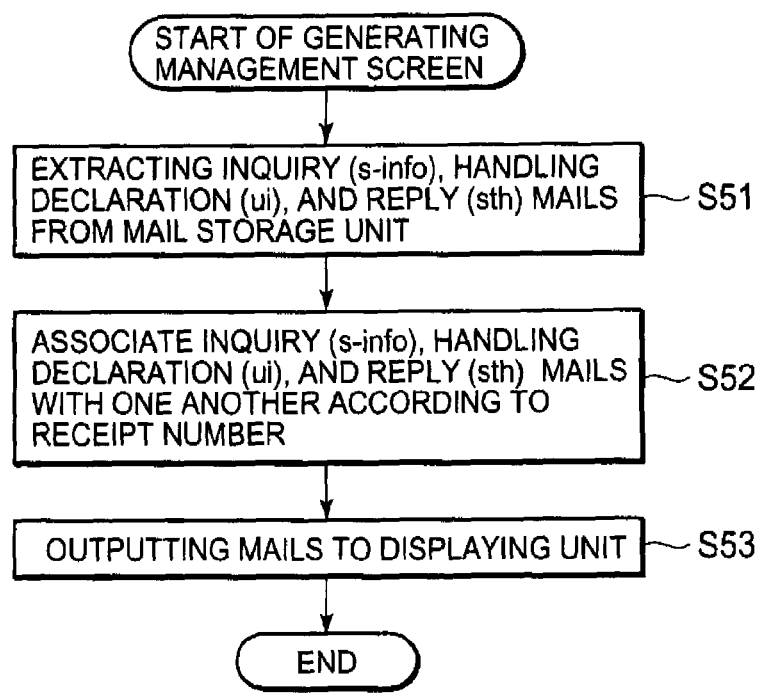

MANAGEMENT ASSISTANCE DEVICE, MANAGEMENT ASSISTANCE METHOD, AND COMPUTER PROGRAM FOR MANAGING RESPONSES TO E-MAILS

BACKGROUND OF THE INVENTION

1. Field of the Invention

The present invention relates to a management assistance device and a management assistance method which are suitable for managing a status of responding to an incoming e-mail, that is, for example, who has sent a reply e-mail in response to an incoming e-mail. The present invention also relates to a program which causes a computer to execute a process for assisting the management of such a status of responding to an incoming e-mail.

2. Description of the Related Art

So far, Some people has proposed the technology for creating automatically or semi-automatically reply e-mails responding to incoming e-mails received from customers or the like. For example, Japanese Patent Application Laid-open Publication No. 2002-49564 discloses a mail creation device which parses an incoming e-mail to extract characteristic information from a result of the parsing, and which thereby selects a reply template corresponding to the extracted characteristic information. Thus, a draft of a reply mail is automatically created. A user edits, when needed, the draft of the reply mail created by the mail creation device, and thereafter sends the reply mail.

On the other hand, management of a status of responding to an incoming e-mail, which is, for example, who has sent a reply e-mail in response to an incoming e-mail, is expected to be performed by simple and reliable means. To take an instance, in a company, a plurality of persons in charge receive the same incoming inquiry e-mail from a customer or the like, and where one of the plurality of persons in charge is expected to respond to the incoming inquiry e-mail. In this case, unless each person in charge can find out who has sent a reply e-mail, a reply mail may not be sent, or the plurality of persons in charge redundantly send reply e-mails.

Japanese Patent Application Laid-open Publication Nos. 2003-256335 and 2003-296251 disclose systems which assist management of a status of responding to incoming e-mails. Here, the management is performed in a group to which a plurality of persons in charge belong. The systems disclosed in JP-A Nos. 2003-256335 and 2003-296251 comprise terminals used by the respective persons in charge, and a management server for centrally managing a status of responding to incoming e-mails. To be more precise, the management server receives incoming e-mails via a mail server connected to the Internet, and then generates response management information on deadlines for replies to the received incoming e-mails and on person in charge of the replies, and the like. Thereby, the management server stores the response management information in a database, and manages this information. Each person in charge accesses the management server with his or her own terminal, browses incoming mails, and retrieves and browses the response management information stored in the database. Accordingly, the persons in charge can find out the status of responding to incoming mails.

In addition to the terminals used by the respective persons in charge, the systems disclosed in JP-A Nos. 2003-256335 and 2003-296251 need a management server which receives incoming e-mails via a mail server connected to the Internet, and which centrally manages a status of responding to incoming e-mails. For this reason, there is a problem that a status of responding to incoming e-mails cannot be easily managed with terminals or the like respectively used by a plurality of persons in charge.

SUMMARY

A management assistance device of a first embodiment of the present invention assists management of responses to an incoming e-mail, and includes a mail receiving unit, a mail storage unit, a mail sending unit and a management screen generation unit. The mail receiving unit receives the incoming e-mail and a reply e-mail responding to the incoming e-mail. The mail storage unit stores the incoming e-mail received by the mail receiving unit, and first identification information which is added to the incoming e-mail. The mail sending unit sends a reply e-mail which is created in response to the incoming e-mail stored in the mail storage unit, and to which the first identification information has been added. The management screen generation unit generates a management screen which displays the incoming e-mail stored in the mail storage unit and the reply e-mail, as being associated with each other based on the first identification information.

The management assistance device of the first embodiment can be typically achieved by personal computers respectively used by a plurality of persons in charge of responding to incoming e-mails. According to the configuration of the management assistance device of the first embodiment, a status of responding to incoming mails can be managed by referring to the incoming e-mails and the reply e-mails received by the management assistance device. Specifically, each of a plurality of persons in charge who handle the incoming e-mails, uses the management assistance device, and thereby each person in charge can manage a status of responding to the incoming e-mails by using his/her personal computer, without making inquires with a management server, as disclosed in JP-A Nos. 2003-256335 and 2003-296251, which centrally manages incoming e-mails.

A management assistance system of a second embodiment includes the management assistance device of the first embodiment, and an e-mail delivering device. Furthermore, the e-mail delivering device adds the first identification information to the received incoming e-mail, and then delivers it to an address at which the management assistance device can receive e-mails. Then, the e-mail delivering device adds second identification information to the reply e-mail received from the management assistance device, and then delivers it to an address at which the management assistance device can receive e-mails.

A method of a third embodiment of the present invention is a management assistance method for e-mails. To be more precise, initially, first identification information is added to a received incoming e-mail, and then it is delivered to an address at which a management assistance device can receive e-mails. Secondly, the management assistance device receives the resultant incoming e-mail to which the first identification information is added. Next, the management assistance device sends the resultant incoming e-mail which contains the first identification information, and which is created in response to the incoming e-mail, to an address at which a sender of the incoming e-mail can receive e-mails, and to an address at which the management assistance device can receive e-mails. Then, the management assistance device receives the reply e-mail containing the first identification information. Finally, the management assistance device displays, on a displaying device, the incoming e-mail and the reply e-mail, as being associated with each other based on the first identification information.

Using the above-described method, each of the management assistance devices makes it possible to manage a status of responding to incoming e-mails equally and separately, without making inquires with a management server, as disclosed in JP-A Nos. 2003-256335 and 2003-296251, which centrally manages the status of responding to incoming e-mails.

A program of a fourth embodiment of the present invention includes a storage unit and a displaying unit, and gets a computer capable of sending and receiving e-mails to work as an e-mail management assistance device. Here, the e-mail management assistance device achieved by the present program includes: selecting means which selects incoming e-mails to which first identification information is added, and reply e-mails responding to incoming e-mails, and which contain the first identification information added to the incoming e-mails, from a storage unit in which e-mails received by the computer are stored; and displaying means which displays, on displaying means, the incoming e-mails and the reply e-mails selected from the storage unit, as being associated with each other based on the first identification information.

By executing the program of the fourth embodiment of the present invention on PCs or the like used by the respective persons in charge who handle incoming e-mails, a status of responding to incoming e-mails can be easily managed by computers using by the respective persons in charge.

According to the present invention, it is possible to provide a management assistance device, a management assistance system, a management assistance method, and a computer program which are capable of easily managing a status of responding to an incoming e-mail, that is, who has sent a reply e-mail responding to an incoming e-mall.

BRIEF DESCRIPTION OF THE DRAWINGS

FIG. 5 is an example of a management information mail received by the terminal for person in charge 14;

FIG. 6 is a flowchart showing a process of creating a taking-charge declaration mail, which is performed by the terminal for person in charge 14;

FIG. 7 is an example of the handling declaration mail received by the terminal for person in charge 14;

FIG. 8 is a flowchart showing a process of creating a reply mail, which is performed by the terminal for person in charge 14;

FIG. 9 is an example of the reply mail received by the terminal for person in charge 14;

FIG. 10 is a flowchart showing a process of generating contents of management screen, which is performed by the terminal for person in charge 14;

DETAILED DESCRIPTION OF THE PREFERRED EMBODIMENTS

Figure 1:
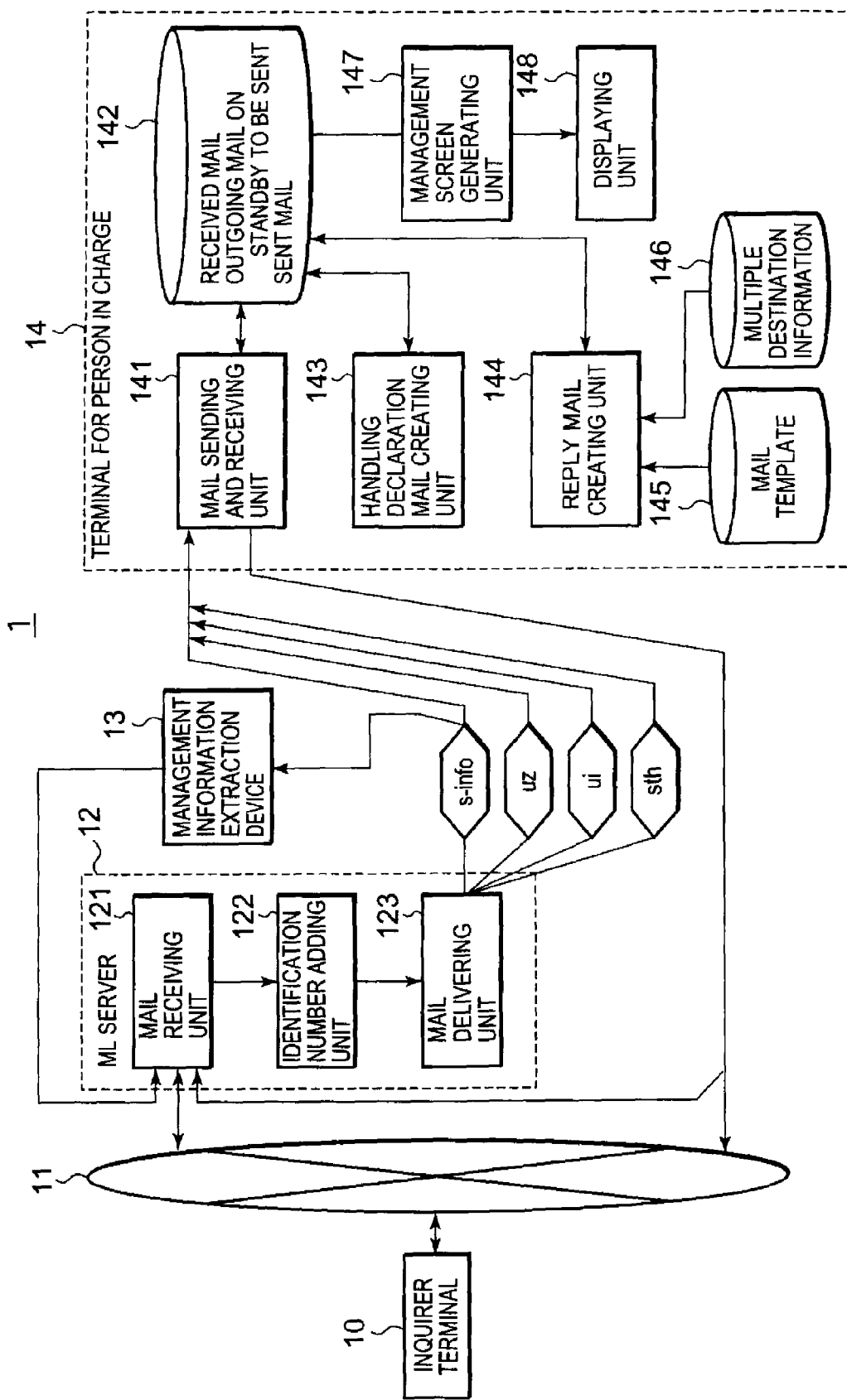
FIG. 1 is a block diagram showing an entire configuration of an e-mail processing system 1 of an embodiment of the present invention.

A specific embodiment of the present invention will be described below in detail with reference to the accompanying drawings. Throughout the drawings, the same reference numerals and symbols are given to corresponding components. To make descriptions clear, duplicate descriptions will be omitted as appropriate.

FIG. 1 shows a configuration of an e-mail processing system 1 of an embodiment of the present invention. The e-mail processing system 1 is a system which receives e-mails from customers clients, and by which a plurality of persons in charge respond to customers' inquiries.

In FIG. 1, an inquirer terminal 10 is a terminal used by customers, and provided with a function of sending and receiving e-mails, and is typically a personal computer on which an e-mail client software (a mailer program) is installed. The inquirer terminal 10 sends an inquiry e-mail containing a customer's inquiry, to an e-mail address for inquiries. Moreover, the inquirer terminal 10 receives a reply e-mail sent by a persons in charge for inquiries via the Internet.

An ML server 12 receives an e-mail to a mailing list, and delivers the e-mail to an e-mail address set in the mailing list. To be more precise, a mail receiving unit 121 initially receives an e-mail sent to the mailing list. Then, an identification number providing unit 122 inserts identification information, with which the received e-mail can be uniquely identified, into a subject part of the received e-mail. Finally, an e-mail delivering unit 123 duplicates the received e-mail after the insertion of the identification information, by referring to the mailing list. Thereafter, the e-mail delivery unit 123 sends the thus duplicated e-mails to the respective mail addresses on the mailing list.

The ML server 12 of the present embodiment takes a role of delivering processes, by use of four mailing lists, for delivering four kinds of e-mails, which are an inquiry mail (s-info mail), a management information mail (uz mail), a handling declaration mail (ui mail) and a reply mail (sth mail). Contents described in each four kinds of e-mails will be shown later.

A management information extraction device 13 receives an s-info mail delivered from the ML server 12, and then extracts management information from the received s-info mail. Thereby, the management information extraction device 13 generates a management information mail (uz mail), and then sends the generated uz mail to a predetermined e-mail address. In addition, a destination address of the uz mail is an address on a mailing list which is set for sending management information mails to a plurality of persons in charge.

Terminal for person in charges 14 are those respectively used by a plurality of persons in charge. Incidentally, FIG. 1 shows only one terminal for person in charge 14 for convenience in explanation. However, it is needless to say that a plurality of terminals for persons in charge 14 exist in the e-mail processing system 1 in accordance with the number of persons in charge who handle inquiry e-mails.

In FIG. 1, a mail sending and receiving unit 141 takes a role of sending and receiving e-mails. An e-mail storage unit 142 stores therein an e-mail (an incoming mail) received by the mail sending and receiving unit 141; an e-mail (a standby outgoing mail) which is on standby to be transmitted by the mail sending and receiving unit 141; and an e-mail (a sent mail) sent by the mail sending and receiving unit 141. For example, when the terminal for person in charge 14 is a PC, the mail sending and receiving unit 141 is achieved by using a mailer program which gets a PC to work as an e-mail sending and receiving client. At this time, the e-mail storage unit 142 corresponds to a folder designated, by the mailer program, to be a storage for e-mails.

Depending on an input made by a user using the terminal for person in charge 14, a handling declaration mail creation unit 143 creates information on a persons in charge handling inquiry mails, and a handling declaration mail (ui mail) containing an identification number which uniquely identifies an inquiry mail, and then stores the information and the handling declaration mail thus created.

Depending on an input made by a user using the terminal for person in charge 14, a reply mail creating unit 144 creates a reply mail (sth mail) containing an identification number which uniquely identifies an inquiry mail and a reply content for the inquiry mail, and then stores the reply mail.

A mail template storage unit 145 is a storage unit which stores templates for reply mails. A multiple address destination information storage unit 146 is a storage unit which stores pieces of information such as e-mail addresses to be set as multiple address destinations for reply mails, and also stores the names of the respective multiple address destinations. These pieces of information are referred to by the reply mail creating unit 144.

A management screen generation unit 147 extracts inquiry mails (s-info mails), handling declaration mails (ui mails), and reply mails (sth mails) from incoming mails stored in the e-mail storage unit 142; then causes these extracted mails to correspond to one another; and thereby creates management screen information for displaying these mails on a displaying unit 148. The displaying unit 148 is a displaying device such as a liquid crystal display or a CRT.

Figure 2:
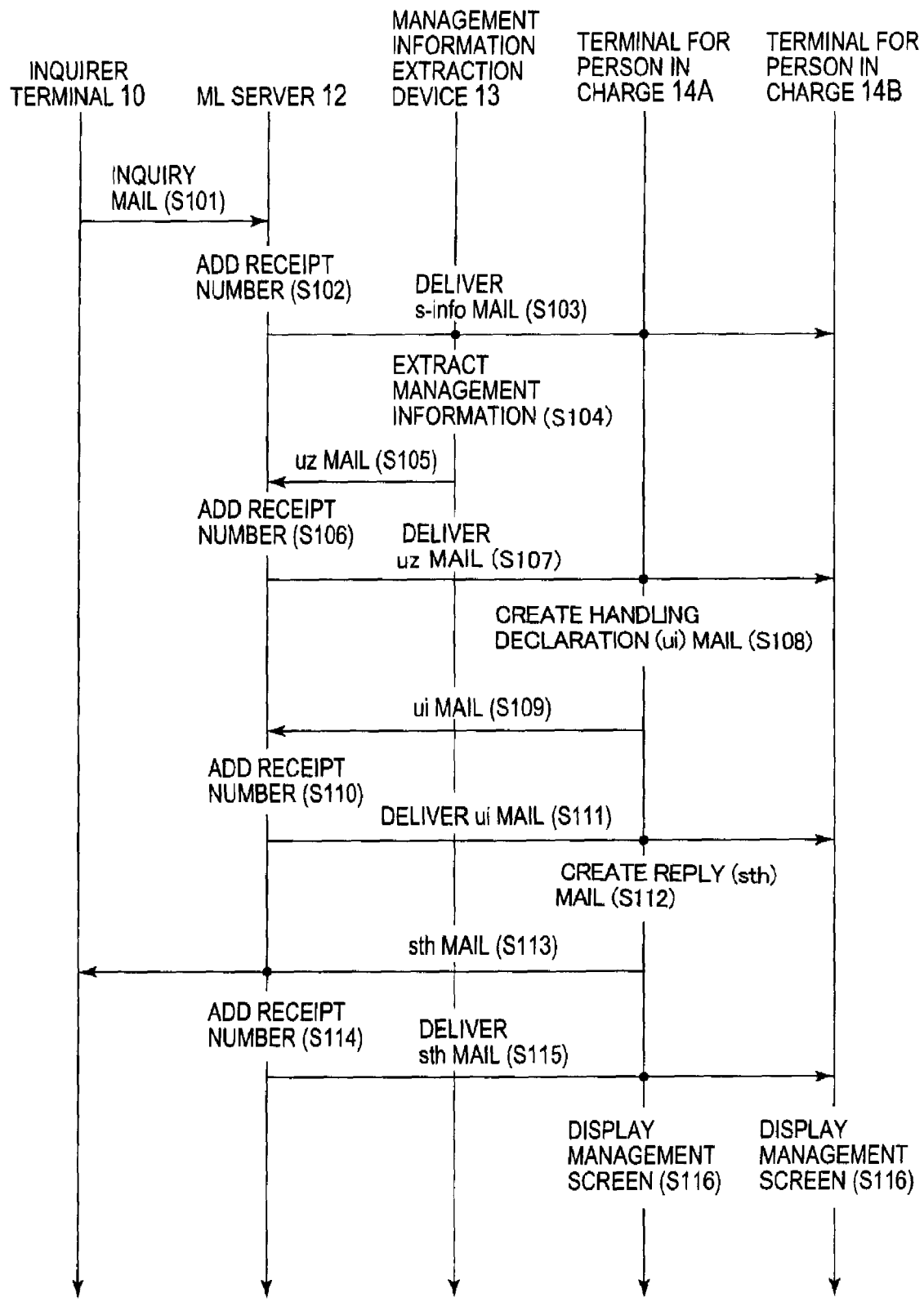
FIG. 2 is a view showing entire processes at the time of receiving an inquiry mail in the e-mail processing system 1.

Next, an operation of the e-mail processing system 1 will be described with reference to FIGS. 2 to 11. FIG. 2 is a timing chart showing a flow of the entire processes from the receiving of an inquiry mail to the sending of a reply mail. In FIG. 2, a terminal for person in charge 14A is a terminal using by persons in charge who directly handles the sending of a reply mail answering the inquiry mail. Meanwhile, a terminal for person in charge 14B is a terminal using by another persons in charge who does not directly handle the writing of a reply mail.

First, an inquiry mail is sent from the inquirer terminal 10 (Step S101). The ML server 12 receives the inquiry mail, and adds, to the inquiry mail, identification information with which the inquiry mail can be uniquely identified (Step S102). The identification number, which is added to an inquiry mail, is hereinafter referred to as a receipt number. The ML server 12 inserts the receipt number in a subject of the received inquiry mail, and sends this mail to an e-mail address defined on a mailing list (Step S103). In the mailing list prepared for receiving inquiry mails, e-mail addresses at which a plurality of persons in charge and a management information extraction device 13 can respectively receive e-mails are registered in advance. An inquiry mail to which a receipt number is given by the ML server 12 is hereinafter referred to as a "s-info mail."

Figures 3, 4:
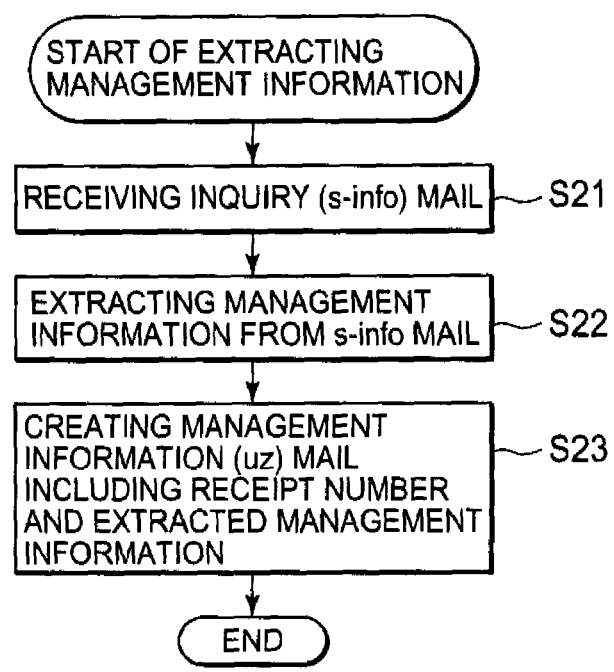
FIG. 3 is an example of an inquiry mail received by a terminal for person in charge 14.
FIG. 4 is a flowchart showing a management information extraction process performed by a management information extraction device 13.

FIG. 3 shows an example of the s-info mail delivered by the ML server 12. In the example of FIG. 3, a mail header is defined by lines from the line of "From" to the line of "Content-Transfer-Encoding." A part subsequent to the above lines indicates a text of an e-mail. Incidentally, the mail header of FIG. 3 shows part of a header added to an actual e-mail, and a mail header, such as "Received," which is added by an SMTP server existing on the Internet 11, is omitted. The same is applied to examples of e-mails appeared in the following description. In FIG. 3, character string "[s-info:45830]" inserted into the line of "Subject" indicates a receipt number added to the inquiry mail.

Returning to FIG. 2, in Step S104, the management information extraction device 13 performs a management information extraction process. The process will be described in detail according to a flowchart in FIG. 2. First, in Step S21, an s-info mail delivered by the ML server 12 is received. In Step S22, management information is acquired from the received s-info mail. Here, the management information is information which is used for managing inquiry mails after handling thereof, and which contains attribute information on clients who are the senders of inquiry mails, product names respectively of target products on which the inquiries have been made, and the like. The management information may contain, in addition to information contained directly in inquiry mails, information obtained by searching in a database (not shown) on the basis of information extracted from the inquiry mails. For example, detailed attribute information on the client who is a mail sender may be acquired by performing a search on a database on the basis of a sender's e-mail address contained in the mail header of an inquiry mail. Finally, the management information extraction device 13 creates a control information mail (uz mail) containing a receipt number and acquired management information (Step S23). With the uz mail including a receipt number added to an s-info mail, the s-info mail and the uz mail can be associated with each other.

Returning to FIG. 2, in Step S105, the management information extraction device 13 sends a created uz mail to a predetermined mailing list. The mailing list is provided so that management information is delivered to a plurality of persons in charge. The ML server 12 receives the uz mail sent by the management information extraction device 13, and then inserts identification information, with which the received mail can be uniquely identified, in a subject of the received mail (Step S106). The ML server 12 sends the uz mail, in which the identification information is inserted, to an e-mail address defined on a mailing list (Step S107). In the mailing list prepared for receiving uz mails, e-mail addresses at which a plurality of persons in charge can receive e-mails are registered in advance.

FIG. 5 shows an example of a uz mail delivered by the ML server 12. The example of FIG. 5 is one created based on the s-info mail shown in FIG. 3. In FIG. 5, character string "[uz: 17581]" inserted into the line of "Subject" indicates identification information added to the uz mail. In addition, the uz mail of FIG. 5 contains the receipt number added to the original s-info mail in the "Subject" of the mail header and the mail text. Thereby, the s-info mail and the uz mail can be associated with each other.

Returning to FIG. 2, in Step S108, the handling declaration mail creation unit 143 provided to the terminal for person in charge 14A executes a process of creating a handling declaration mail (ui mail) on the basis of an input made by a person in charge who handles inquiry mails. The above-described process will be described in detail according to a flowchart shown in FIG. 6. First, in Step S31, the e-mail storage unit 142 is searched, and then s-info mails stored in the e-mail storage unit 142 are extracted therefrom. Thereby, a selection screen including a list of received s-info mails is displayed on the displaying unit 148. This selection screen may also be used as a management screen generated by the management screen generation unit 147. In Step S32, a selection of an s-info mail by a person in charge is accepted. In Step S33, a ui mail is created. Here, the ui mail contains information on a person in charge, and a receipt number added to the s-info mail selected in Step S32, and is to be sent to an address in a predetermined mailing list. With the uz mail including a receipt number added to the s-info mail, the s-info mail and the uz mail can be associated with each other.

Finally, in Step S34, the thus created ui mail is stored in a folder of the e-mail storage unit 142 for outgoing mails which is on standby to be sent. Incidentally, the flowchart of FIG. 6 shows the case where a selection by a person in charge is accepted on the basis of a list of s-info mails. Alternatively, since uz mails and s-info mails correspond to each other on a one-to-one basis, a selection from a list of uz mails may be accepted.

Returning to FIG. 2, in Step S109, the mail sending and receiving unit 141 provided to the terminal for person in charge 14A sends a ui mail to a predetermined mailing list. This mailing list is provided so that the ui mail is delivered to a plurality of persons in charge. The ML server 12 receives the ui mail sent by the terminal for person in charge 14A, and then inserts identification information, with which the received e-mail can be uniquely identified, in the Subject of the received e-mail (Step S110). Then, the ML server 12 sends the ui mail, to which the identification information is added, to an e-mail address defined on the registration list of the mailing list (Step S111). In the mailing list prepared for receiving ui mails, e-mail addresses at which a plurality of persons in charge can receive e-mails are registered in advance.

FIG. 7 shows an example of a ui mail delivered by the ML server 12. The example of FIG. 7 is one created on the basis of the s-info mail shown in FIG. 3. In FIG. 7, character string "[ui:74128]" inserted into the line of "Subject" indicates identification information added to the ui mail. In addition, the ui mail of FIG. 7 contains the receipt number added to the original s-info mail in the "Subject" of the mail header and in the mail text. Thereby, the s-info mail and the ui mail can be associated with each other. In addition, the ui mail of FIG. 7 contains, as information on a person in charge, the name of the person in charge in the mail text.

Returning to FIG. 2, in Step S112, the reply mail creating unit 144 provided to the terminal for person in charge 14A performs a process of creating a reply mail (sth mail) on the basis of an input made by the person in charge. The above-described process will be described in detail according to a flowchart shown in FIG. 8. First, in Step S41, the e-mail storage unit 142 is searched, and then s-info mails stored in the e-mail storage unit 142 are extracted therefrom. Thereby, a selection screen including a list of received s-info mails is displayed on the displaying unit 148. This selection screen may also be used as a management screen generated by the management screen generation unit 147. In Step S42, a selection of an s-info mail by the person in charge is accepted.

In Step S43, a screen for selecting a template of a reply mail and multiple address destinations of the reply mails is displayed on the displaying unit 148, and thus a selection of a template of the reply mail and multiple address destinations, which selection is made by a person in charge, is accepted. As multiple address destinations displayed on the screen for selecting multiple address destinations, candidates for multiple address destinations are preferably displayed. Here, the candidates are selected from the multiple address destination information storage unit 146 on the basis of information on the sender of an inquiry mail. For example, sales representatives' e-mail addresses are preferably displayed as candidates for multiple address destinations. Here, the sales representatives are selected in accordance with a mail address of a customer who is the sender of an inquiry mail, a customer's company, a customer's telephone number and the like. Thereby, a person in charge can make a more accurate selection of multiple address destinations.

In Step S44, an sth mail is created. Here, the sth mail contains information on a person in charge and the receipt number added to the s-info mail selected in Step S42. The destination address of the sth mail is a mail address of an inquirer. The multiple address destinations Cc. or Bcc.) of the sth mail are those selected in Step S43, addresses on the predetermined mailing list. With the sth mail including a receipt number added to the s-info mail, the s-info mail and the sth mail can be associated with each other.

Finally, in Step S45, the thus created sth mail is stored in a folder of the e-mail storage unit 142 for outgoing mails which is on standby to be sent. Incidentally, the flowchart of FIG. 8 shows the case where a selection by a person in charge is accepted on the basis of the list of s-info mails. Alternatively, since the uz mails and the s-info mails, as well as the ui mails and the s-info mails, correspond to each other on a one-to-one basis, a selection from a list of uz mails or of uz mails may be accepted.

Returning to FIG. 2, in Step S113, the mail sending and receiving unit 141 provided to the terminal for person in charge 14A sends the sth mail to an address of an inquirer, to multiple address destinations, and to addresses on a predetermined mailing list. This mailing list is provided so that the sth mail is delivered to a plurality of persons in charge. The ML server 12 receives the sth mail sent by the terminal for person in charge 14A, and then inserts identification information, with which the received e-mail can be uniquely identified. (Step S114). Then, the ML server 12 sends the sth mail, to which the identification information is added, to an e-mail address defined on the registration list of the mailing list (Step S115) In the registration list of the mailing list prepared for receiving sth mails, e-mail addresses at which a plurality of persons in charge can receive e-mails are registered in advance.

FIG. 9 shows an example of an sth mail delivered by the ML server 12. The example of FIG. 9 is one created on the basis of the s-info mail shown in FIG. 3. In FIG. 9, character string "[sth:34363]" inserted into the line of "Subject" indicates identification information added to the sth mail. Moreover, the sth mail of FIG. 9 contains the receipt number added to the s-info mail in the "Subject" of the mail header. Thereby, the s-info mail and the sth mail can be associated with each other.

Returning to FIG. 2, in Step S116, the management screen generation unit 147 provided to each of the terminals for persons in charge 14A and 14B generates a management screen, and then outputs the management screen to the displaying unit 148. A management screen generation process will be described in detail according to a flowchart shown in FIG. 10. First, in Step S51, the mail storage unit 142 is searched, and then s-info mails, ui mails and sth mails are extracted therefrom. Next, in Step S52, in accordance with receipt numbers contained in the respective e-mails thus extracted, the s-info mails, the ui mails and the sth mails are associated with one another. Finally, in Step S53, a management screen indicating a result of the associations established in S52 is outputted to the displaying unit 148.

Incidentally, FIG. 2 shows the displaying of the management screen as the final processing step, for convenience in explanation. However, the management screen can be displayed when needed.

Figure 11:
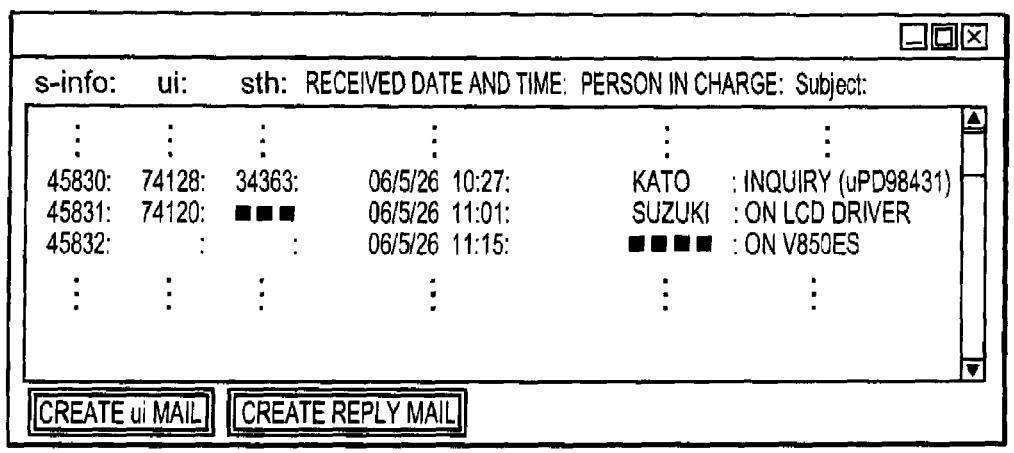
FIG. 11 is an example of the management screen generated by the terminal for person in charge 14.

FIG. 11 shows an example of the management screen outputted to the displaying unit 148. The management screen of FIG. 11 adopts a table form in which identification information on three kinds of mails, which are the s-info mails, the ui mails and the sth mails, is displayed on the same line, so that a person in charge can easily grasp an association relationship among the s-info mails, the ui mails and the sth mails. To be more precise, displayed on the same line are identification information on, i.e. a receipt number of, an s-info mail; identification information on a ui mail and on an sth mail containing the receipt number; date and time at which an inquiry mail is received; information on a person in charge contained in the ui mail; and a subject of the inquiry mail.

For example, on the line of the receipt number "s-info: 45830" of FIG. 11, identification information "ui:74128" and "sth:34363" corresponding to the receipt number are displayed. Thus, it is easy to find out that a reply has been sent. Meanwhile, on the line of the receipt number "s-info:45831" of FIG. 11, identification information "ui:74120" corresponding to this receipt number is displayed, while identification information on an sth mail is not displayed. Thereby, it can be easily grasped that handling declaration has been done while a reply mail has not been sent. Moreover, on the line of the receipt number "s-info:45832" of FIG. 11, both pieces of identification information on the ui mail and the sth mail have not been displayed. Accordingly, it is easy to find out that neither the handling declaration nor a reply to the inquiry mail has been done.

Although various kinds of display forms are possible besides the specific example shown in FIG. 11, it is desirable that the three kinds of mails, i.e., the s-info mail, the ui mail and the sth mail, be displayed so that it is easy to find out the association relationship among these mails. For example, these mails may be displayed next to one another. Thereby, a person in charge, who browses the management screen, can easily confirm whether there is a ui mail and a sth mail corresponding to a relevant s-info mail.

As described above, the management systems disclosed in JP-A Nos. 2003-256335 and 2003-296151 each include a management server having a database in which management information on responses to incoming e-mails is stored. Here, the incoming e-mails are received from an e-mail server connected to the Internet. Using his or her own terminal, each person in charge accesses the management server which centrally manages a status of responding to the incoming e-mails, and thereby browses the response management information on the incoming e-mails. Thus, the person in charge can find out the status of responding to the incoming mails. That is, in order for each of the persons in charge responding to incoming e-mails to confirm the current status of responding to the incoming e-mails, it is essential for each of the persons in charge to access the management server.

In contrast, in the e-mail processing system 1 of the present embodiment, inquiry mails, handling declaration mails and reply mails are delivered from the mailing list server 12, which is connected to the Internet, to all persons in charge. Furthermore, received mails, which are received by the terminal for person in charge 14, and which are then stored in the mail storage unit 142, are associated with one another, and thereby a management screen indicating a status of responding to incoming e-mails sent from clients is generated. Thus, each person in charge can grasp a status of responding to incoming e-mails on the basis of e-mails already stored in his or her own terminal for person in charge 14, without accessing the management server which centrally manages the status of responding to the incoming mails, such as that in the respective management systems disclosed in JP-A Nos. 2003-256335 and 2003-296151.

The systems disclosed in JP-A Nos. 2003-256335 and 2003-296151 have a problem that a failure in the management server centrally managing a response status causes a situation where no persons in charge can confirm the response status at the respective terminals for persons in charge. On the other hand, the present invention adopts a configuration in which a status of responding to incoming e-mails is managed in a decentralized manner by using the terminals for persons in charge 14. Thus, a failure in one of the terminals for persons in charge 14 does not influence management of a status of responding to incoming mails responded by the other terminals for persons in charge 14. Hence, the configuration of the present invention has an advantage that it is superior in fault tolerance.

Figure 12:
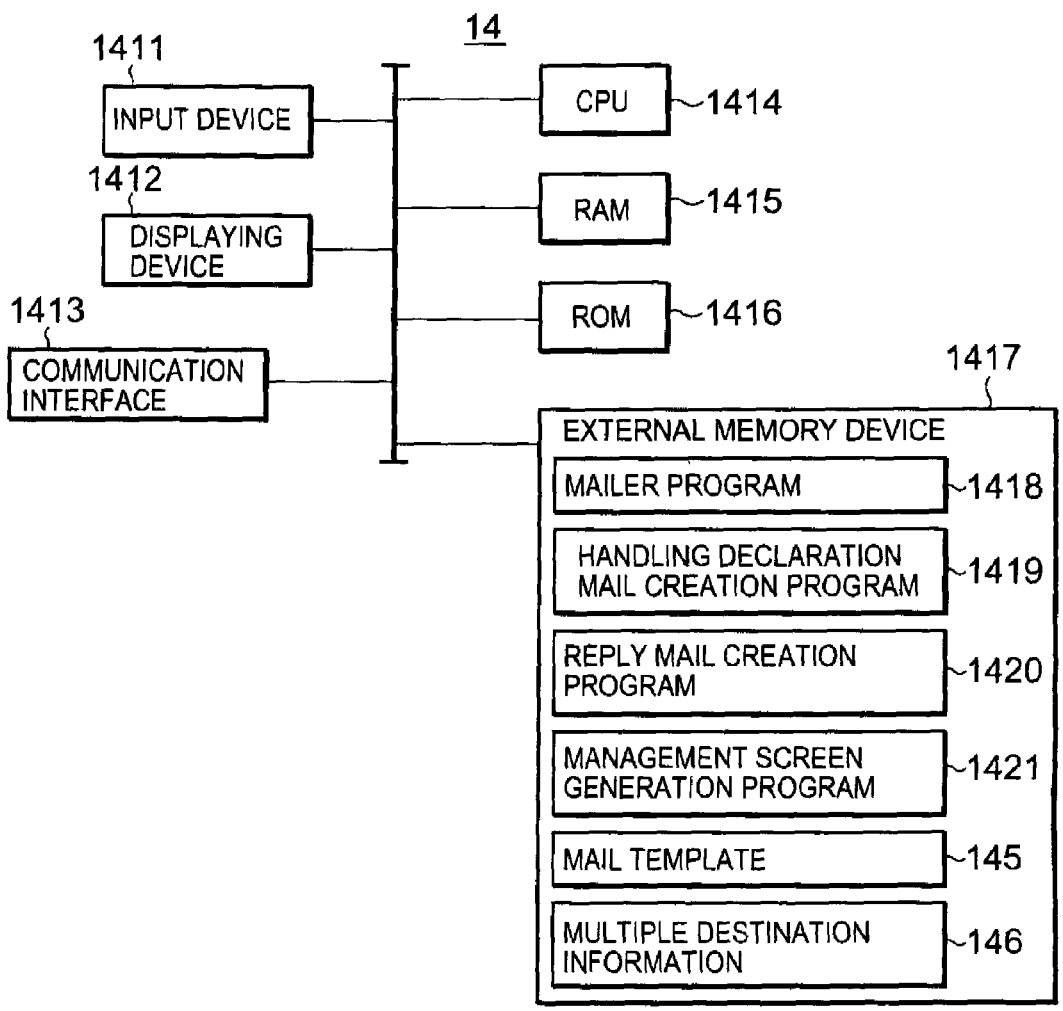
FIG. 12 is a specific example of a configuration of the terminal for person in charge 14.

Note that a typical computer system can be used as the above-described terminal for person in charge 14. As shown in FIG. 12, a usable computer system includes an input device 1411 such as a keyboard or a mouse, a displaying device 1412 such as a liquid crystal display or a CRT, a communication interface 1413 which is connected to a network such as a LAN or an IEEE 1394 to send and receive data, a central processing unit (CPU) 1414 for performing a calculation process, a random access memory (RAM) 1415, a read only memory (ROM) 1416 and an external memory device 1417. For the external memory device 1417, for example, a hard disk drive unit, which is provided to a single computer along with other units, may be used. Alternatively, it is also possible to configure the external memory device as being provided physically apart from a computer, or as a combination of a plurality of hard disk drive units.

In the external memory device 1417, a mailer program 1418, a handling declaration mail creation program 1419, a reply mail creation program 1420 and a management screen generation program 1421 are stored. The mailer program 1418 is a program which causes a computer system to execute a process of the mail sending and receiving unit 141. The handling declaration mail creation program 1419 is a program which causes the computer system to execute a process of the handling declaration mail creation unit 143. The reply mail creation program 1420 is a program which causes the computer system to execute a process of the reply mail creating unit 144. The management screen generation program 1421 is a program which causes the computer system to execute a process of the management screen generation unit 147. By executing these programs by the CPU 1414, a computer system works as the terminal for person in charge 14 of the present embodiment.

Incidentally, the mailer program 1418, the handling declaration mail creation program 1419, the reply mail creation program 1420 and the management screen generation program 1421 can be configured as separate program components. Alternatively, for example, the handling declaration mail creation program 1419, the reply mail creation program 1420 and the management screen generation program 1421 can be configured as one program component.

Other Embodiments

In the above-described embodiment of the present invention, destination addresses of an inquiry mail, of a management information mail and of a handling declaration mail, as well as multiple destination addresses of a reply mail, are set to be e-mail addresses indicating the mailing list. Thus, these mails can be sent to separate addresses respectively of a plurality of persons in charge, which addresses are set as destinations on the mailing list after the ML server 12 receives these e-mails, and then adds, to the e-mails, identification information, with which the e-mails can be uniquely identified. However, instead of providing a single server as the ML server 12 for performing the processes, a plurality of mailing list servers may be provided, for example, for the respective mailing lists.

In the above-described embodiment of the present invention, as identification information with which inquiry mails, control information mails, handling declaration mails and reply mails can be uniquely identified, the ML server 12 uses serial numbers which are added to e-mails sent to addresses on a mailing list. Using such a mailing list, it is made easy to add identification information for uniquely identifying e-mails, and to deliver mails to a plurality of persons in charge. However, the ML server 12 is not necessarily used as long as identification information, with which inquiry mails, management information mails, handling declaration mails and reply mails is unique identifiable, can be added.

The management information extraction device 13 of the present embodiment of the above invention may directly refer to an inquiry mail received by the ML server 12, not to an s-info mail delivered from the ML server 12, and thereby may extract management information on the basis of the reference.

As described above, management information created by the management information extraction device 13 is information used for managing inquiry mails after handling them. Thus, the management information extraction device 13 is not necessarily needed, and the creating and sending of a management information mail which are performed by the management information extraction device 13 may be omitted.

In the e-mail processing system 1 of the present embodiment of the above invention, the processing of sending and receiving handling declaration mails may be omitted. Specifically, it is possible to omit the sending of a handling declaration mail, and to send a reply mail by an operation of a person in charge who has decided to be in charge of replying to an inquiry e-mail from a client.

In the present embodiment of the above-described invention, when sending a reply mail from the terminal for person in charge 14 to an inquirer, mails of which content is the same as that of the reply mail are sent to a mailing list address at which a plurality of persons in charge can receive the mails. However, mails sent to the plurality of persons in charge do not need to be the same as that of the reply mail. That is, it suffices to notify all persons in charge of the fact that a reply mail has been sent, and the content of the mails sent to all of the persons in charge may be different from that of the reply mail.

It is apparent that the present invention is not limited to the above embodiments, but may be modified and changed without departing from the scope and spirit of the invention.

What is claimed is:

1. A terminal comprising:
   a mail sending and receiving unit which receives an incoming e-mail;
   an identification adding unit which adds an identification information to the incoming mail;
   a mail creation unit which creates a reply e-mail via the mail sending and receiving unit in response to the incoming e-mail to which the identification information has been added; and
   a management screen generation unit which generates a management screen which displays the incoming e-mail and the reply e-mail, as being associated with each other based on the identification information.

2. The terminal according to claim 1, wherein the reply e-mail created by the mail creation unit, contains a handling declaration mail which shows a person in charge who handles the incoming e-mail; and the handling declaration mail contains the identification information.

3. The terminal according to claim 2, wherein the reply e-mail created by the mail creation unit contains an answering mail in response to the incoming e-mail; and the answering mail contains the identification information.

4. The terminal according to claim 3, wherein the management screen includes information on a received date and time of receiving the incoming e-mail, the person in charge of handling the incoming e-mail and a received date and time of the handling declaration mail, and sending date and time of the reply e-mail based on the identification information.

5. The terminal according to claim 1, wherein the reply e-mail created by the mail creation unit contains an answering mail in response to the incoming e-mail and the answering mail contains the identification information.

6. The terminal according to claim 1, wherein the terminal is one of a plurality of terminals corresponding to a plurality of persons in charge, the plurality of terminals included in a management system corresponding to the plurality of persons in charge.

7. The terminal according to claim 6, wherein the plurality of terminals have corresponding unique e-mail address registered on an e-mail server.

8. A system comprising:
   a terminal comprising:
   a mail sending and receiving unit which receives an incoming e-mail;
   an identification adding unit which adds a first identification information to the incoming mail;
   a mail creation unit which creates a reply e-mail via the mail sending and receiving unit in response to the incoming e-mail to which the identification information has been added; and
   a management screen generation unit which generates a management screen which displays the incoming e-mail and the reply e-mail, as being associated with each other based on the first identification information; and
   a server coupled to said terminal to provide the first identification information, and a second identification information for said reply e-mail.

9. The terminal according to claim 1, wherein the identification information is added to a subject line of the incoming e-mail.

10. The system according to claim 8, wherein the first identification information is added to a subject line of the incoming e-mail.

11. A method for managing e-mail, the method comprising:
   receiving an incoming e-mail from an e-mail server to which a first identification information has been added by an identification adding unit in the e-mail server;
   sending a handling declaration e-mail which shows a person in charge of handling the incoming e-mail to the e-mail server in response to the receiving the incoming e-mail, the handling declaration e-mail including the first identification information;
   receiving the handling declaration e-mail and adding a second identification information to the received handling declaration mail, and sending the handling declaration e-mail to a plurality of terminals of persons in charge of responding to the incoming e-mail;
   receiving the handling declaration e-mail which includes the second identification information and creating a reply e-mail in response to the incoming e-mail to the handling declaration e-mail; and generating a management screen which displays the incoming e-mail, the handling declaration e-mail, and the reply e-mail as being associated with each other based on the first identification information, wherein the management screen includes information on a received date and time of receiving the incoming e-mail, the person in charge of handling the incoming e-mail and a received date and time of the handling declaration e-mail, and sending date and time of the reply e-mail.

12. The method according to claim 11, wherein the first and second identification information is included in a subject line of the reply e-mail, and information of the person in charge is included in a body of the handling declaration e-mail.

13. A system comprising:
a plurality of terminals, each of said plurality of terminals comprising:
a mail sending and receiving unit which receives an incoming e-mail to which identification information comprising a first identification information has been added;
a mail creation unit which creates a reply e-mail via the mail sending and receiving unit in response to the incoming e-mail to which the first identification information has been added;
a management screen generation unit which generates a management screen which displays the incoming e-mail and the reply e-mail, as being associated with each other based on the first and second identification information; and
a server coupled to said terminal to add the first identification information to said incoming e-mail and a second identification information to said reply e-mail.

* * * * *